Nov. 22, 1938.  H. L. GRIMES  2,137,486
AIRPLANE
Filed Aug. 22, 1936  3 Sheets-Sheet 1

INVENTOR
Herman L. Grimes,
BY
ATTORNEYS

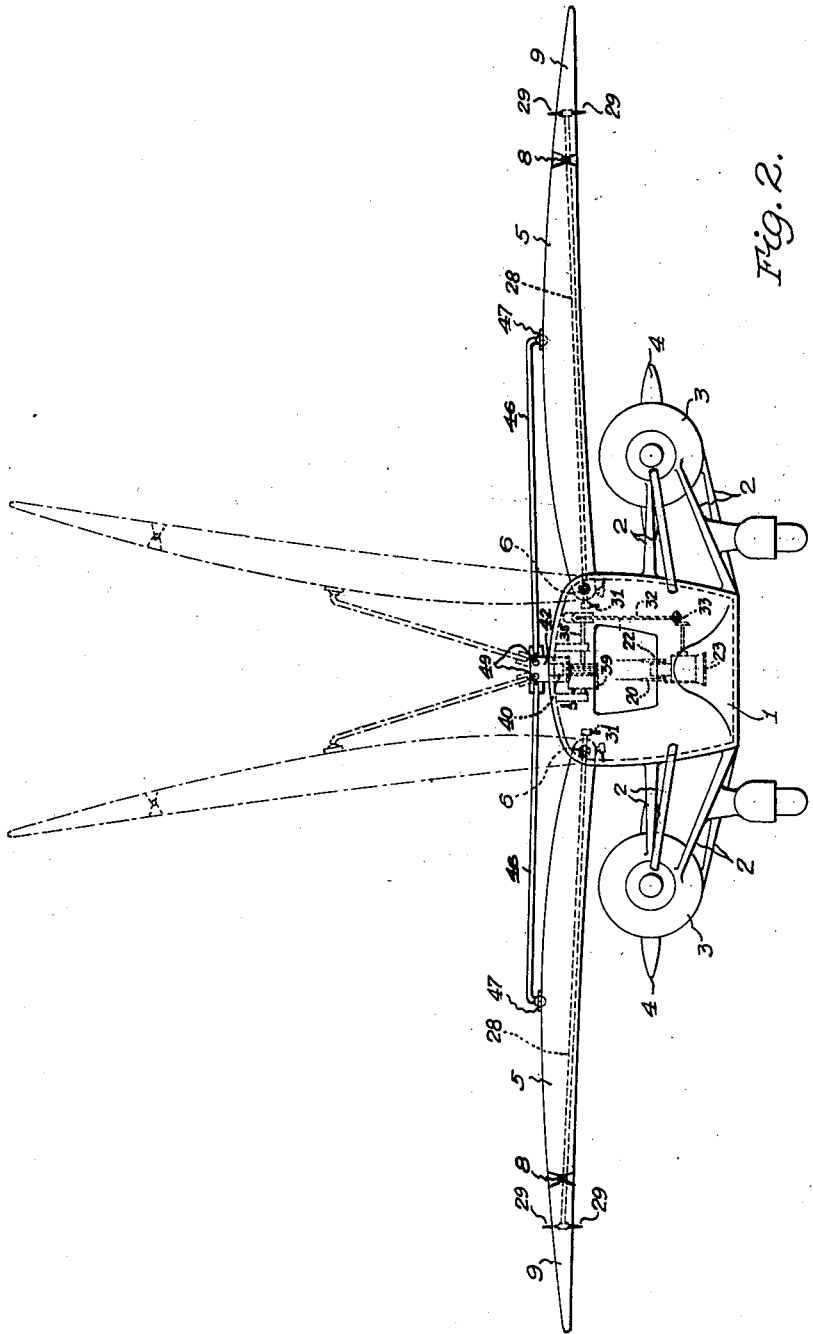

Nov. 22, 1938.   H. L. GRIMES   2,137,486
AIRPLANE
Filed Aug. 22, 1936   3 Sheets-Sheet 3
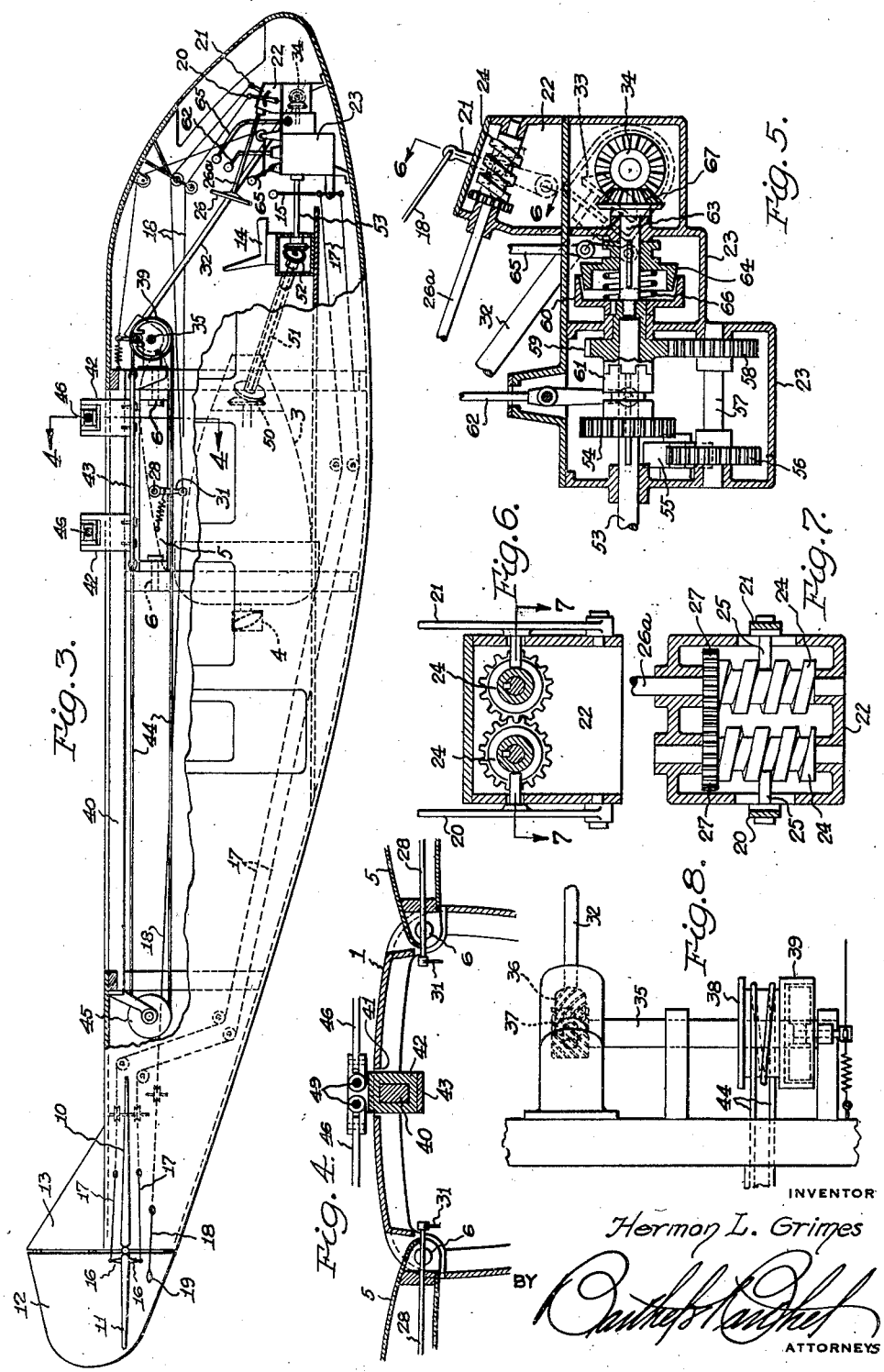
INVENTOR
Herman L. Grimes
ATTORNEYS Patented Nov. 22, 1938

2,137,486

UNITED STATES PATENT OFFICE 2,137,486

AIRPLANE

Hermon L. Grimes, Detroit, Mich.

Application August 22, 1936, Serial No. 97,312

9 Claims. (Cl. 244—49)

This invention relates to a heavier than air flying machine and more particularly to an airplane having wings of extended area and length for sustaining the machine in flight; and an object of the present invention is to provide such a machine with foldable wings and power means for effecting a folding and adjustment of such wings, said folding means being connected to each wing intermediate the ends thereof and serving to lock each wing in its adjusted position and to support and strengthen the same.

A further object is to provide a particular shape and arrangement of ailerons in the form of wing tips whereby the same are rendered more effective in manipulating the ship and to operatively connect these tips with means for operating the steering rudder of the ship for simultaneous manipulation.

It is also an object to provide a simple, compact and efficient control mechanism including a geared transmission for controlling the application of power from underslung motors outside and laterally of the fuselage, and for applying power to fold and adjust the wings, said transmission being located within the fuselage and provided with hand levers for controlling the several operations of said transmission.

It is also an object to provide certain other new and useful frames in the construction and arrangement of wing folding mechanism and in the arrangement and centralization of all controls for manoeuvering the ship in flight and for controlling the transmission of power.

With the above and other ends in view, the invention resides in the matter hereinafter set forth and more particularly pointed out, reference being had to the accompanying drawings, wherein;

Fig. 2 is a front end elevation of the same;

Figure 1:
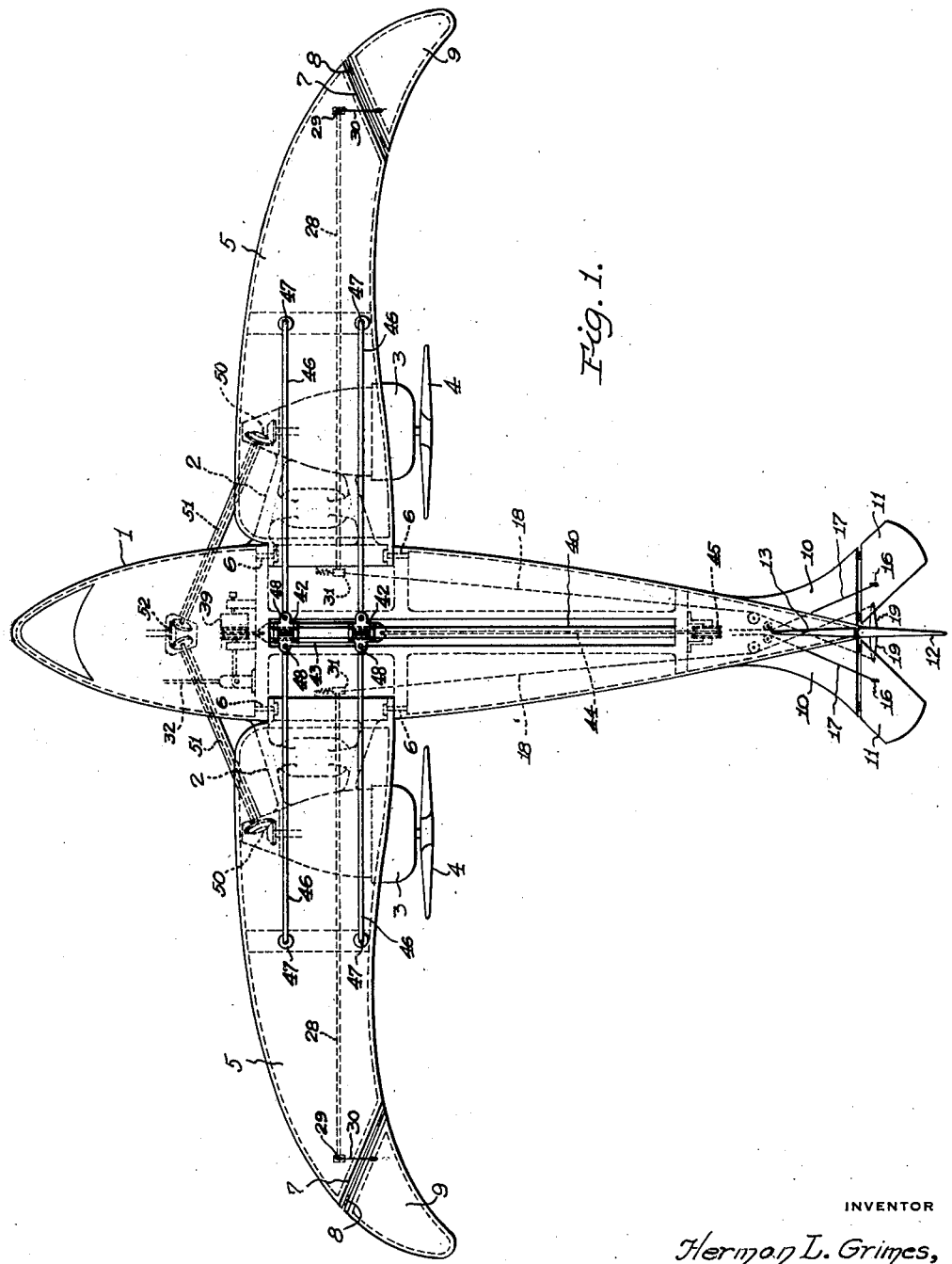
Figure 1 is a plan view of an airplane illustrative of an embodiment of the present invention.

Fig. 3, an enlarged side elevation of the fuselage as shown in Figs. 1 and 2 and showing the same partly broken away and in section to disclose the internal construction;

Fig. 4 is a transverse vertical section substantially upon the line 4—4 of Fig. 3;

Fig. 5 is an enlarged longitudinal section through a transmission mechanism and adjacent parts;

Fig. 6 is a transverse section substantially upon the line 6—6 of Fig. 5 showing the arrangement of worms for transmitting motion from the hand wheel operated shaft in steering;

Fig. 7 is a section through Fig. 6, substantially upon the line 7—7, and

Fig. 8 is a detail plan view of a portion of power take-off means for operating means for effecting wing folding and adjustment.

As shown in the accompanying drawings, 1 indicates the fuselage which may have any desired configuration, and projecting laterally from opposite sides of which are brackets 2 for the support of motor casings or streamlined shells 3 within which the driving motors, not shown, are mounted with the rear end of the shaft of each motor projecting from the rear end of said casing and upon which projecting end, a propeller 4 of the pusher type is secured for propelling the airplane forwardly.

Main wings, each indicated as a whole by the numeral 5, are pivotally attached at the inner ends to the fuselage at opposite sides thereof adjacent its upper side to swing upwardly from extended, horizontal, operative position to a substantially vertical inoperative or folded position, said wings each turning upon the axis of its pivots 6, which axes extend parallel with the longitudinal axis of the fuselage and each wing, in plan view, preferably has a rearwardly curving forward edge and a rear edge of any desired configuration, said wings each preferably tapering in width toward its free outer end 7 which is formed straight but at an acute angle to the longitudinal center line of the wing, and to this end 7 of each wing is pivotally attached, as by hinges 8, a wing tip or aileron 9, the edges of which are preferably curved in plan view of the wing, to form continuations of the front and rear edges of each wing proper and provide pivoted extension extending outwardly and rearwardly from each wing end. Because these wing tips are hinge connected to the extreme outer ends of the wings and yet by reason of their longitudinal curvature and angular attachment to the wing ends, they extend rearwardly of the trailing edges of the wings, these tips are most effective in manipulating the ship, but offer little resistance to flight.

The tail end of the fuselage is formed with walls projecting outwardly from opposite sides of the tail thereof and these walls form horizontal airfoils 10 to the rear end edges of which, two horizontal or altitude rudders 11 are hinged and extend rearwardly and laterally therefrom in spaced apart relation to permit the vertical or steering rudder 12 to swing therebetween upon its hinge connection with the rear end edge of a fixed vertical airfoil 13 on the upper side of the fuselage.

The aviator's seat 14 is located within the fore part of the fuselage and adjacent this seat is a hand lever 15 (see Fig. 3) for controlling the altitude rudders 11, this lever being connected to arms 16 on each of said rudders by cables 17 for simultaneous up or down swinging movement of said rudders, and the lateral swinging of the vertical rudder 12 is effected by means of cables 18 connected at their rear ends to arms 19 projecting laterally from opposite sides of said rudder, said cables being crossed forwardly of the rudder and led forwardly in the fuselage with their forward ends made fast to the upper ends of pivoted levers 20 and 21, so that a forward swinging of the right hand lever 20 will swing said rudder toward the left and a like movement of the lever 21, will swing the rudder toward the opposite side. These levers 20—21 are pivotally mounted at their lower ends upon opposite walls of a gear box 22 which box is mounted upon the forward end of a transmission casing 23 which is located within the nose of the fuselage forwardly of the aviator's seat. To simultaneously swing these levers in opposite directions, a pair of worms 24 is mounted in said box 22 with their axes parallel and upon each lever is a pin 25 to engage the thread of the adjacent worm and swing said levers in opposite directions when said worms are rotated simultaneously in opposite directions by the turning of the shaft 26a of one worm by means of a steering wheel 26 secured upon the rear end thereof, said worm shafts having meshing gears 27 for transmitting motion from one worm to the other and rotating said worms in opposite directions to swing one lever in one direction and the other lever simultaneously in an opposite direction, thereby pulling upon one cable 18 and playing out on the other to swing the rudder 12 in the desired direction according to the direction in which the steering wheel 26 is turned.

Means is provided to operate the wing tips 9 in conjunction with the operation of the steering rudder 12 so that when the airplane is directed to the right or left, particularly in making sharp turns, the wing tips will be automatically adjusted to effect banking of the plane and prevent side slip, said means comprising a shaft 28 rotatively mounted within each wing and extending longitudinally thereof with its outer end provided with arm 29 extending beyond the upper and lower surfaces of the wing with the ends of each of said arms connected to opposite sides of the adjacent wing tip, by cables 30 (Fig. 1) to turn the same upon its hinge connection to the end of the wing upon rotation of said shaft or rod 28. To so rotate said rods 28 when a pull is exerted on either of the cables 18 to swing the rudder 12, an arm 31 is secured upon the inner end of each rod and to the free end of each arm, one of the cables 18 is connected intermediate its ends so that a longitudinal movement of either cable will swing these arms and turn said rods in the proper direction to deflect the wing tip of one wing upwardly and that of the other downwardly and in proportion to the swing of the steering rudder.

Power means is provided for folding and adjusting the wings 5, said means comprising a power takeoff shaft 32 gear connected at its lower forward end in any suitable manner, as by bevel gears 33, to a horizontal driven shaft 34 within the forward end of the transmission casing 23, said takeoff shaft extending upwardly and rearwardly therefrom to a transverse shaft 35 located in the top part of the fuselage and to which shaft said takeoff shaft is connected by a worm 36 on shaft 32 and a worm gear 37 on said horizontal shaft 35, as shown in Fig. 8. Upon this shaft 35 is mounted a winding drum 38 and a brake 39 is arranged to retard rotation of said drum and shaft or to hold the same against turning when the application of power is discontinued.

A guide bar 40 is secured to the fuselage framing and extends longitudinally thereof opposite a longitudinal slot 41 in the top wall of the fuselage, and mounted upon this bar to slide thereon as a track therefor, is a pair of blocks 42 projecting outwardly through said slot. These blocks are connected by a connecting strip 43 secured to their inner sides and said blocks are moved along said track bar by means of a cable 44 secured to the rear end of said strip 43 and extending rearwardly to beyond the rear end of the track or guide bar 40 where it passes over a pulley 45, thence forwardly beneath said track to the drum 38 around which it is wrapped and then extended rearwardly and made fast to the forward end of said strip.

To connect these blocks 42 with the wings 5 so that movement of the blocks along their way will swing said wings upon their pivoted connection to the fuselage, two pairs of strut rods 46, one pair for each wing, are pivotally attached at their inner ends to said blocks and at their outer ends they are connected by universal connections 47 to the upper side of each wing at substantially one half the length of the wing. The pivotal connection of each rod to its block is such that it is free to swing thereon about a vertical pivot 48 and also upon a horizontal pivot and therefore, as the blocks are moved rearwardly from the position shown, an upward pull is exerted on each wing, turning them to the vertical position shown in dotted lines in Fig. 2 when said blocks have reached the rear end of their guideway and in which folded position they may be held by the brake 39 while the airplane is in its hangar to conserve space therein. When the wings are fully extended, the blocks are at the forward end of their movement and opposite the pivotal connections of the outer ends of the rods to the wings with the rods of one wing substantially in longitudinal alignment with the rods for the other wing, and therefore in flight, upward pressure of air upon the under side of the wings creates a direct end thrust on said rods and this thrust has no material tendency to move the blocks and permit the wings to fold upwardly. Likewise downward pressure on the wings creates a direct endwise pull upon the rods which pull has no tendency to move the blocks along their way, and therefore load strains are transmitted by these rods to the blocks and thence to the fuselage. As these rods are pivotally attached at their ends to the blocks and wings, there is little or no bending strains applied to the rods and as the rods are attached to the wings intermediate the length of each wing, the wings are very materially stiffened thereby and may be made much lighter in weight. Upward pressure upon the wings will have little effect in moving the blocks from any point in the length of their movement along the way and therefore the wings may be adjusted to any partially folded position to meet conditions of flight and may be held in the position to which they are adjusted by setting the brake 39 after the discontinuance of the application of power to turn the drum shaft 35.

In the application of power for extending the wings, it is necesary to reverse the direction of rotation of the drum 38 from that in which it is rotated in folding the wings and to effect such reversal; the direction of rotation of the shaft 32 is reversed by means of gearing in the transmission casing 23 interposed in the line of drive between the motors in the casings 3 at opposite sides of the fuselage and beneath the wings, and the shaft 34 which drives the shaft 32 through the bevel gears 33. Power is transmitted from the forward ends of the engines by means of miter gears 50 to drive shafts 51 extending diagonally downward and forwardly into the fore part of the fuselage to a miter gear connection 52 with the rear end of the main drive shaft 53 of the usual reversing gear assembly in the casing 23, said assembly including a driving gear 54 splined on said drive shaft to turn therewith and to be moved longitudinally thereon into and out of engagement with an intermediate gear 55 in mesh with a gear 56 on a countershaft 57 having a second gear 58 in mesh with a gear 59 freely rotatable upon the main shaft 53 and upon the hub of which is secured the cup member 60 of a cone clutch. The opposite end of the hub of the gear 59 is formed to provide one member of an endwise engageable clutch 61, the hub of gear 54 being formed to provide the other member, which members are engaged or disengaged by shifting said gear 54 by means of a shifting lever 62. A stub shaft 63 is mounted in longitudinal axial alignment with the drive shaft 53 and on this stub shaft is splined for sliding movement thereon into and out of the cup member 60, a cone member 64 moved endwise by a hand lever 65 against the action of a coiled spring 66 normally holding cup and cone separated. On the forward end of the stub shaft 63 is a bevel gear 67 in mesh with a like gear on the end of the horizontal shaft 34 for transmitting motion to the power takeoff shaft 32 for operating the wing folding mechanism. The cone clutch therefore controls the transmission of motion to drive the wing folding mechanism so that the same may be discontinued at any point during the movement of the blocks 42 and the brake 39 then set to hold the wings in the position to which they are adjusted, said brake being operated by means of a hand lever 68 mounted upon the casing 23 convenient to the aviator and all of the other controls. The clutch 61 controls the direction of rotation of the power takeoff shaft 32 so that the movement of the blocks 42 along their guideway may be reversed to effect a folding or an extension of the wings as desired.

Obviously changes may be made in the construction, arrangement or combination of parts as shown and described, without departing from the spirit of the invention and I do not, therefore, limit myself to the particular construction shown.

Having thus fully described my invention what I claim is:

1. In an airplane including a fuselage and wings pivotally attached at their inner ends to said fuselage, means for swinging said wings upon their pivotal attachment to said fuselage, the axes of said pivots extending longitudinally of and parallel with the fore and aft axis of said fuselage, said means including strut members pivotally attached at their outer ends to said wings outwardly from their pivotal attachment to said fuselage, and means slidably secured within said fuselage to which the inner ends of said members are pivotally attached, for operating said members to swing said wings upwardly.

2. An airplane including a fuselage, wings pivotally attached at their inner ends to said fuselage to swing upwardly upon pivots extending longitudinally of and parallel with the fore and aft axis of said fuselage, strut members pivotally attached to said wings outwardly from their pivotal attachment to said fuselage, and means secured within and slidably movable longitudinally of said fuselage and to which the inner ends of said strut members are pivotally attached for swinging said strut members upon their pivotal connection to said wings, and swing said wings upwardly relative to said fuselage upon their pivotal attachment thereto.

3. In an airplane including a fuselage, wings pivotally attached to said fuselage at the inner ends of said wings to be swung upwardly into folded position upon axes extending longitudinally of and parallel with the fore and aft longitudinal axis of said fuselage, members each pivotally attached at its outer end outwardly of said wing from the pivotal attachment of the wing to said fuselage, each by means of a universal joint and means slidably secured to and extending into said fuselage and to which the inner ends of said members are pivotally attached with said members for each wing extending in parallelism, said means being slidably movable to move said members for one wing into longitudinal axial alignment with those of the other wing when said wings are moved to fully extended position.

4. In an airplane including a fuselage and wings pivotally attached to opposite sides of said fuselage to swing upwardly upon pivots extending longitudinally of and parallel with the fore and aft axis of said fuselage, strut members pivotally attached at their outer ends to the upper sides of said wings, for universal movement, and a member secured to and slidably movable upon the upper side of said fuselage longitudinally thereof and to which the inner ends of said strut members are pivotally attached, and means for moving said member longitudinally of said fuselage.

5. An airplane including a fuselage and wings pivotally attached at their inner ends to opposite sides of said fuselage, means for swinging said wings upon their pivotal attachment to said fuselage, said means comprising a pair of members for each wing pivotally attached at their outer ends to each wing intermediate the ends thereof, operating means comprising a pair of spaced axially aligned slidable blocks to which the inner ends of said members are pivotally connected, with the said member connected to one wing, in longitudinal alignment with the members attached to the other wing and lying close to the upper sides of said wing when said wings are in extended position, and means for moving said operating means to move said members connected to said wings, to a relative angular position, whereby a pull is created through said members upon said wings to swing said wings into folded position.

6. In an airplane the combination of a fuselage, wings pivotally attached at their inner ends to opposite sides of said fuselage to swing upon pivots extending longitudinally of said fuselage, a slot in the top of said fuselage extending longitudinally thereof, means movable along said slot and slidably secured therewithin, a pair of strut members for each wing having universal pivotal attachment thereto at their outer ends intermediate the ends of the wing and extending inwardly in parallelism and pivotally attached at their inner ends to said means in said slot and means for moving said other means along said slot to move said strut members for one wing into angular position relative to the members for the other wing and swing the wings upon their pivotal connections to the fuselage.

7. An airplane comprising a fuselage, wings pivotally attached at their inner ends to opposite sides of said fuselage, a way extending longitudinally of said fuselage midway between the pivotal attachment of one wing to the fuselage and the pivotal attachment of the other wing thereto, rods pivotally attached at their outer ends to said wings intermediate the ends thereof and extending inwardly in longitudinal axial alignment when the wings are in extended position, a member movable longitudinally of said way for a distance substantially equal to the length of one of said rods and to which the inner ends of said rods are pivotally attached, means for moving said member along said way, and means for reversing the direction of travel of said member along said way.

8. An airplane as characterized in claim 7, and wherein said means for moving said member along its way includes power transmitting means including said means for reversing the direction of movement of said member along its way.

9. In an airplane of the folding wing type and having a fuselage, a plurality of wings pivotally supported on either side of said fuselage and adapted normally to extend outwardly from said fuselage in a substantially horizontal direction, a longitudinal opening in the top of said fuselage and extending rearwardly in an axial direction from a point in said fuselage adjacent said wings to a point in said fuselage substantially forward of the tail of said airplane, means secured in said opening to said fuselage for reciprocable movement therealong and extending upwardly therefrom, a pair of stiff rods movably fixed to the top of each of said wings and to the extended portions of said means and adapted for a horizontal position during the normal position of said wings, and means associated with said other means for moving the latter rearwardly along said opening for a distance substantially equal to the length of one of said rods and into proximity with said second mentioned point in said fuselage for pivoting said wings about their supports.

HERMON L. GRIMES.